United States Patent [19]
Imaizumi

[11] Patent Number: 4,609,263
[45] Date of Patent: Sep. 2, 1986

[54] TELEPHOTO LENS SYSTEM HAVING AN IMPROVED FOCUSING ARRANGEMENT

[75] Inventor: Masaki Imaizumi, Tokyo, Japan

[73] Assignee: Olympus Optical Co., Ltd., Tokyo, Japan

[21] Appl. No.: 576,898

[22] Filed: Feb. 3, 1984

[30] Foreign Application Priority Data

Feb. 4, 1983 [JP] Japan ................................. 58-16081

[51] Int. Cl.$^4$ .................................................. G02B 13/02
[52] U.S. Cl. ..................................................... 350/454
[58] Field of Search ................................. 350/454–457

[56] References Cited

U.S. PATENT DOCUMENTS 3,854,797  12/1974  Yokota ................................. 350/454
4,240,699  12/1980  Sato et al. ...................... 350/454 X
4,457,595   7/1983  Mihara .............................. 350/454

FOREIGN PATENT DOCUMENTS 55-39803  10/1980  Japan .

*Primary Examiner*—John K. Corbin
*Assistant Examiner*—Scott J. Sugarman
*Attorney, Agent, or Firm*—Cushman, Darby & Cushman

[57] ABSTRACT

A focusing method for a telephoto lens system comprising a front lens group having positive refractive power, an intermediate lens group having negative refractive power, and a rear lens group having positive refractive power, the focusing method for a telephoto lens system being arranged to focus the telephoto lens system by moving the intermediate lens group toward the image side and the rear lens group toward the object side.

6 Claims, 8 Drawing Figures

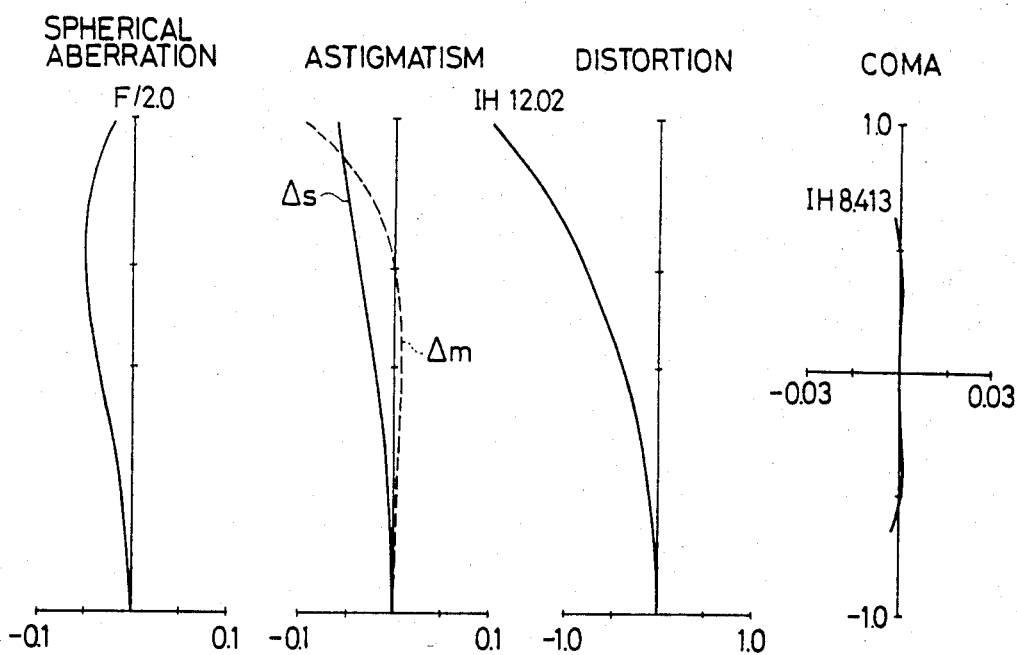
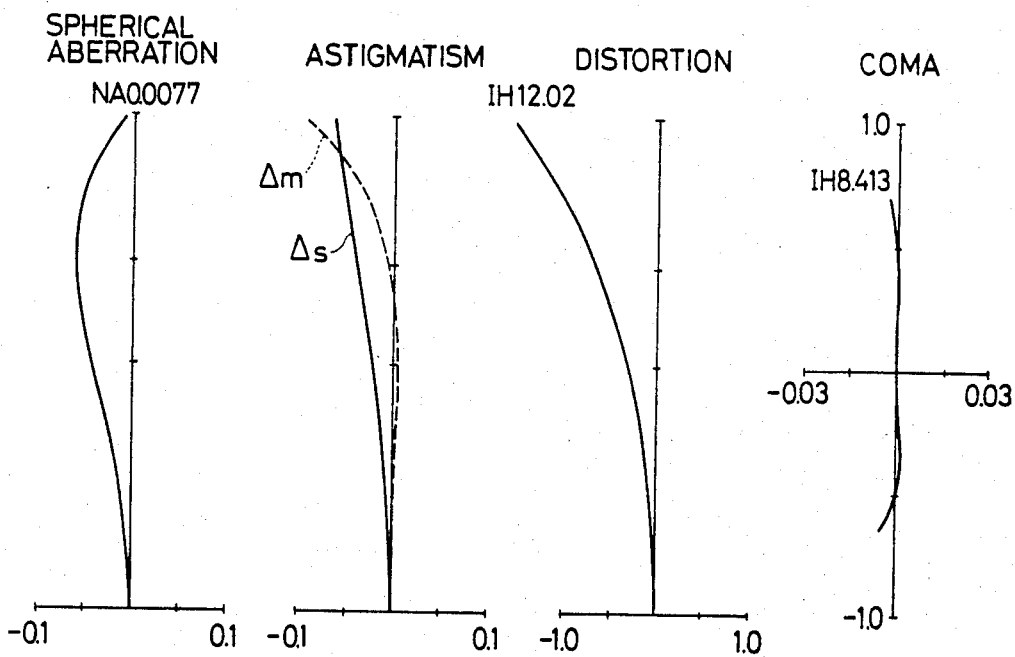

TELEPHOTO LENS SYSTEM HAVING AN IMPROVED FOCUSING ARRANGEMENT

BACKGROUND OF THE INVENTION (a) Field of the Invention

The present invention relates to a focusing method for a telephoto lens system and, more particularly, to a focusing method for a telephoto lens system with a large aperture ratio.

(b) Description of the Prior Art

In recent years, there is increasing demand for large aperture ratio telephoto lens systems in various fields. A large aperture ratio telephoto lens system enables to take photographs at a high shutter speed. Therefore, when photographing an indoor sport game, stage scene, etc., for example, it is possible to take photographs without causing object shaking and, consequently, the limitation in the photographing conditions is reduced. Besides, as the F-number with the full open aperture is small, it is possible to take a photograph in which the object is relieved by mading the depth of field shallow and putting the things in front and rear of the object out of focus, such photography being characteristic of telephoto lens systems.

However, for a telephoto lens system with a large aperture ratio, the front lens group should be necessarily made large in diameter and should be composed of a large number of lens elements and, consequently, the front lens group becomes heavy. Therefore, in case of the conventional focusing method to advance the lens system as a whole, it is inconvenient for handling in various points, for example, the center of gravity shifts forward at the time of focusing, the helicoid becomes heavy because the amount of advancing movement should be made large as the focal length is long, and so forth.

Besides, the inner focusing method is also known as a focusing method for a telephoto lens system. This method is to focus the lens system by moving a part of lens elements in the rear lens group toward the image side or object side, i.e., by moving one or two lens components. In case of the inner focusing method to move one lens component in the rear lens group, it is difficult to keep the quality of image satisfactorily favourable up to a short distance. On the other hand, in case of the inner focusing method to move two lens components (for example, as disclosed in Japanese published examined patent application No. 39803/80), the power of one of the two lens components is weak and, consequently, the amount of movement of the other lens compoennt becomes large.

Another focusing method is known for a telephoto lens system comprising a front lens group having positive refractive power, an intermediate lens group having negative refractive power and a rear lens group having positive refractive power, i.e., a method to focus the lens system by moving the negative lens group (the intermediate lens group) toward the image side. However, when the negative lens group is moved toward the image side, heights of paraxial rays which enter the negative lens group become low and the diverging effect becomes weak. As a result, spherical aberration tends to be undercorrected and this tendency becomes stronger when the lens system is focused on an object at a short distance. To cancel the above-mentioned tendency that spherical aberration is undercorrected, it is so arranged that the negative intermediate lens group is composed of a plural number of lens components, a surface having strong converging effect is provided therein, and said negative lens group is moved toward the image side inclusive of said surface so as to thereby reduce the converging effect of said surface and to thereby cancel the undercorrecting tendency of spherical aberration. In this method, however, the lens system is focused by substantially moving the negative lens component only, and the amount of movement of the negative lens component becomes large. Therefore, the rigidity of lens tube becomes low when a cam is formed on it, and the rotary angle of focusing ring becomes large.

SUMMARY OF THE INVENTION

It is, therefore, a primary object of the present invention to provide a focusing method for a telephoto lens system comprising a front lens group having positive refractive power, an intermediate lens group having negative refractive power, and a rear lens group having positive refractive power, said focusing method for a telephoto lens system being arranged to move said negative intermediate lens group toward the image side and said positive rear lens group toward the object side so as to thereby allot the focusing function to both of said lens groups in order to thereby reduce the amounts of movements of respective lens groups at the time of focusing, said focusing method for a telephoto lens system being further arranged that a surface having strong comverging effect is provided in said negative intermediate lens group so that a favourable image is obtained up to an object at a short distance.

When a surface having strong converging effect is provided in the intermediate lens group in case that a telephoto lens system comprising a positive front lens group, negative intermediate lens group and positive rear lens group is focused by moving the intermediate lens group toward the image side and rear lens group toward the object side, the heights of paraxial rays which enter the surface having strong converging effect (for example, the cemented surfaces in embodiments shown later) become low as the intermediate lens group is moved and, consequently, spherical aberration tends to be overcorrected, i.e., tends to vary toward the "plus" direction. Besides, as the intermediate lens group as a whole has sufficient power as a negative lens group, the object point is shifted toward the lens system when said lens group is moved toward the image side and, therefore, the focusing action is attained.

On the other hand, as the rear lens group as a whole has positive power, the heights of paraxial rays become high when the rear lens group is moved toward the object side and, consequintly, spherical aberration tends to be undercorrected, i.e., tends to vary toward the "minus" direction. Besides, as the rear lens group has sufficient power as a positive lens group, the object point is shifted toward the lens system when said lens group is moved toward the object side and, therefore, the focusing action is attained.

When the intermediate lens group and rear lens group are moved at the same time as described in the above, from the view point of aberrations, it is possible to balance as a whole the tendency that spherical aberration varies toward the "plus" direction due to decrease of converging effect of the surface having strong converging effect provided in the intermediate lens group, the tendency that spherical aberration varies toward the "minus" direction due to increase of converging effect of the rear lens group, and the tendency that the aberration curve of spherical aberration caused at the positive front lens group inclines toward the "minus" direction due to the fact that the object point is shifted toward the lens system.

On the other hand, the action to shift the object point toward the lens system, i.e., the focusing action, is given to each of the intermediate lens group and rear lens group by giving certain powers to these lens groups.

As described so far, the focusing method for a telephoto lens system according to the present invention enables to attain both of focusing and correction of aberrations and, at the same time, to make the amounts of movements of both lens groups small.

In case that the telephoto lens system is arranged to fulfill the conditions (1) and (2) shown below when the focusing method for a telephoto lens system according to the present invention is adopted, it is more preferable for attaining the object of the present invention.

$$0 < \frac{\phi_s}{\phi} < 4 \left( \phi_s = \Sigma \left( \frac{N' - N}{R} \right) \right) \quad (1)$$

$$0.5 < \frac{|\phi_2|}{\phi_3} < 2.0 \quad (2)$$

In the conditions shown in the above, reference symbol $\phi$ represents the power of the lens system as a whole, reference symbols $\phi_2$ and $\phi_3$ respectively represent powers of the intermediate lens group and rear lens group, reference symbol $\phi_s$ represents the sum of powers of cemented surfaces in the intermediate lens group, reference symbols N and N' respectively represent refractive indices of substances in front and rear of the cemented surface, and reference symbol R represents the radius of curvature of the cemented surface.

As described before, the intermediate lens group as a whole has negative power and has the function for correcting spherical aberration. Therefore, when the intermediate lens group is moved for the purpose of focusing, spherical aberration tends to be undercorrected. However, in the focusing method according to the present invention, a surface having converging effect is provided in the intermediate lens group. Therefore, it is possible to cancel the above-mentioned tendency of undercorrection by means of function of said surface and to thereby make aberration well balanced. For this purpose, it is preferable to fulfill the condition (1).

When the value defined by the condition (1) becomes lower than the lower limit thereof, the surface for making spherical aberration undercorrected is lost. As a result, the diverging effect of the intermediate lens group becomes weak and converging effect of the rear lens group becomes strong at the time of focusing and, therefore, spherical aberration will be undercorrected. On the other hand, wheh the value defined by the condition (1) becomes larger than the upper limit thereof, aberration of higher order occurs at the cemented surface, and this is not desirable.

When the value defined by the condition (2) becomes lower than the lower limit thereof, the power of the intermediate lens group becomes weak and, consequently, the converging effect of the cemented surface relatively becomes strong. When the power of the intermediate lens group becomes weak as mentioned in the above, the amount of movement of the intermediate lens gorup at the time of focusing becomes large. Besides, as the converging effect of the cemented surface becomes strong, spherical aberration tends to be overcorrected at the time of focusing. Therefore, it is difficult to well balance the amount of movement of the intermediate lens group with the correcting function of the cemented surface for spherical aberration at the time of said movement. In other words, when the amount of movement of the intermediate lens group is made large by giving priority to focusing, spherical aberration will be overcorrected. When priority is given to correction of aberration, it becomes impossible to focus the lens system unless the amount of movement of the rear lens group is made large and, consequently, the space for focusing should be necessarily made large. When the value defined by the condition (2) becomes larger than the upper limit thereof, the power of the intermediate lens group becomes strong, and the converging effect of the cemented surface will be cancelled by the diverging effects of other surfaces having negative powers. Besides, as the power of the rear lens group becomes weak, the amount of movement of the rear lens group increases and, consequently, the space for focusing should be necessarily made large.

When the intermediate lens group and rear lens group and moved for focusing in the above-mentioned focusing method, the numerical aperture NA' (NA'=n sin $\theta$) on the exit side cannot be kept constant when the lens system is focused on an object at a short distance unless the diameter of the rear lens group is made large. Besides, it is necessary to made the diameter of the intermediate lens group also large. As a result, the diameter of the lens tube becomes large, the diameter of the focusing ring necessarily becomes large, and it becomes inconvenient for focusing. This means that the convenience in handling, i.e., an advantage attained by adopting the inner focusing method, is lost.

In the present invention, the above-mentioned disadvantage is eliminated by stopping down the stop so that the numerical aperture NA' on the exit side has the relation expressed as NA'=NA/(1+$\beta$) (where, reference symbol NA represents the numerical aperture on the exit side when the lens system is focused on an object at the infinite distance, and reference symbol $\beta$ represent the lateral magnification when the lens system is focused on an object at a finite distance) when the distance to the object becomes shorter. Thus, it is possible to focus the lens system without causing decrease in the quality of image when the lens system is focused on an object at a short distance, the diameter of the front lens does not become large and, when photographing by using a Strobo light or the like by setting the photographing conditions manually, it is possible to accurately decide the exposure by using the following formula:

$$\frac{\text{Effective}}{F-\text{number}} = \frac{F-\text{number when focused}}{\text{at infinite distance}} \times (1 + \beta)$$

Besides, the effective diameter is decided by the heights of paraxial rays determined by NA when focused at the infinite distance and by the heights of upper rays directed toward the marginal portion of the image surface which are also determined by NA when focused at the infinite distance. The heights of paraxial rays do not become higher even when the lens system is focused on an object at a short distance and, moreover, sufficient intensity of light in the marginal portion is attained by the intensity of light which passes through the effective diameter, which is decided when the lens system is focused at the infinite distance. Therefore, the diameter of the focusing ring does not become large, and the convenience in handling does not decrease.

BRIEF DESCRIPTION OF THE DRAWINGS

FIGS. 3 through 5 respectively show graphs illustrating aberration curves of Embodiment 1.

DETAILED DESCRIPTION OF THE PREFERRED EMBODIMENTS

Figure 1:
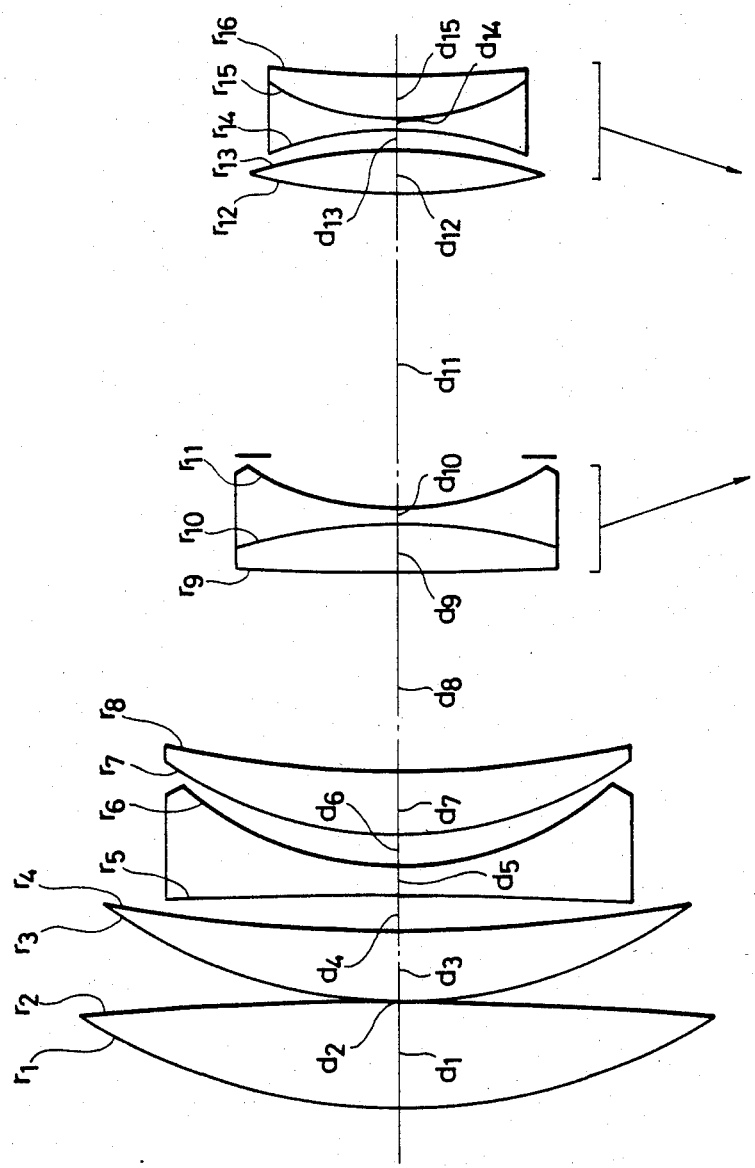
FIG. 1 shows a sectional view of Embodiment 1 of the present invention.

Now, preferred embodiments of the focusing method for a telephoto lens system according to the present invention described so far are shown below.

Embodiment 1

$f = 100.0$   $F/2.0$   $2\omega = 13.7°$ $r_1 = 55.137$
$d_1 = 10.00$   $n_1 = 1.49700$   $\nu_1 = 81.61$
$r_2 = -349.044$
$d_2 = 0.094$
$r_3 = 46.911$
$d_3 = 6.54$   $n_2 = 1.61700$   $\nu_2 = 62.79$
$r_4 = 157.291$
$d_4 = 2.9$
$r_5 = -1163.011$
$d_5 = 2.86$   $n_3 = 1.65412$   $\nu_3 = 39.70$
$r_6 = 32.019$
$d_6 = 2.83$
$r_7 = 38.354$
$d_7 = 5.56$   $n_4 = 1.49700$   $\nu_4 = 81.61$
$r_8 = 100.488$
$d_8 = $ variable
$r_9 = 468.523$
$d_9 = 4.33$   $n_5 = 1.72151$   $\nu_5 = 29.24$
$r_{10} = -51.635$
$d_{10} = 1.67$   $n_6 = 1.52682$   $\nu_6 = 51.12$
$r_{11} = 27.530$
$d_{11} = $ variable
$r_{12} = 52.521$
$d_{12} = 4.06$   $n_7 = 1.78800$   $\nu_7 = 47.43$
$r_{13} = -44.409$
$d_{13} = 1.58$
$r_{14} = -39.585$
$d_{14} = 1.39$   $n_8 = 1.60342$   $\nu_8 = 38.01$
$r_{15} = 19.976$
$d_{15} = 3.89$   $n_9 = 1.67790$   $\nu_9 = 55.33$
$r_{16} = 128.936$ $\phi_2 = -1.366$,   $\phi_3 = 1.706$,   $\frac{|\phi_2|}{\phi_3} = 0.80$
$\phi_s = 0.377$ Embodiment 2

$f = 100.0$   $F/4.0$   $2\omega = 8.9°$ $r_1 = 140.584$
$d_1 = 2.91$   $n_1 = 1.497$   $\nu_1 = 81.61$
$r_2 = -84.975$
$d_2 = 0.31$
$r_3 = 28.095$
$d_3 = 4.74$   $n_2 = 1.43389$   $\nu_2 = 95.15$
$r_4 = -93.665$
$d_4 = 1.16$
$r_5 = -88.920$
$d_5 = 1.69$   $n_3 = 1.8044$   $\nu_3 = 39.58$
$r_6 = 207.795$
$d_6 = $ variable
$r_7 = -60.896$
$d_7 = 1.47$   $n_4 = 1.80518$   $\nu_4 = 25.43$
$r_8 = -21.781$
$d_8 = 0.83$   $n_5 = 1.6134$   $\nu_5 = 43.84$ -continued $r_9 = 22.737$
$d_9 = 1.09$
$r_{10} = -230.220$
$d_{10} = 0.83$   $n_6 = 1.57309$   $\nu_6 = 42.57$
$r_{11} = 224.136$
$d_{11} = $ variable
$r_{12} = 93.303$
$d_{12} = 0.81$   $n_7 = 1.68893$   $\nu_7 = 31.08$
$r_{13} = 27.870$
$d_{13} = 2.16$   $n_8 = 1.697$   $\nu_8 = 48.51$
$r_{14} = -51.187$ $\phi_2 = -3.676$,   $\phi_3 = 2.110$,   $\frac{|\phi_2|}{\phi_3} = 1.74$
$\phi_s = 0.880$ In embodiments shown in the above, reference symbols $r_1, r_2, \ldots$ respectively represent radii of curvature of respective lens surfaces, reference symbols $d_1, d_2 \ldots$ respectively represent thicknesses of respective lenes and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol f represents the focal length of the lens system as a whole.

Table 1 in the following gives the values of airspaces, amounts of movements of the intermediate lens group (xi) and amounts of movements of the rear lens group (xr) of respective embodiments shown in the above when they are focused on the object points at the infinite distance and short distances respectively.

TABLE 1

| | Embodiment 1 | | | |
|---|---|---|---|---|
| Object point | $d_8$ | $d_{11}$ | $x_i$ | $x_r$ |
| ∞ | 18.10 | 28.04 | 0 | 0 |
| −3.06 m | 20.07 | 24.24 | +1.97 | −1.83 |
| −1.06 m | 23.83 | 16.61 | +5.73 | −5.70 |
| | Embodiment 2 | | | |
| Object point | $d_6$ | $d_{11}$ | $x_i$ | $x_r$ |
| ∞ | 19.21 | 8.94 | 0 | 0 |
| −14.70 m | 20.01 | 7.24 | +0.8 | −0.9 |
| −1.03 m | 21.78 | 3.99 | +2.57 | −2.38 |

Table 2 in the following gives the amounts of movements of lens groups in cases that the lens systems according to respective embodiments shown in the above are focused by moving the intermediate lens group only or by moving the rear lens group only.

TABLE 2

| Object point | $x_i$ | $x_{ri}$ |
|---|---|---|
| Lens system according to Embodiment 1 | | |
| ∞ | 0 | 0 |
| −3.06 m | +4.06 | −3.52 |
| −1.06 m | +12.93 | −9.99 |
| Lens system according to Embodiment 2 | | |
| ∞ | 0 | 0 |
| −14.70 m | +1.09 | −3.47 |
| −1.03 m | +3.32 | −11.75 |

In the tables shown in the above, the "+" signs given to the amounts of movements $x_i$ and $x_r$ mean that the corresponding lens groups are moved toward the object side and the "−" signs mean that they are moved toward the image side.

Out of respective embodiments shown in the above, the lens system according to Embodiment 1 has the lens configuration shown in FIG. 1, and the stop is located at the position of 4.55 from and in rear of the surface $r_{10}$.

Figure 5:
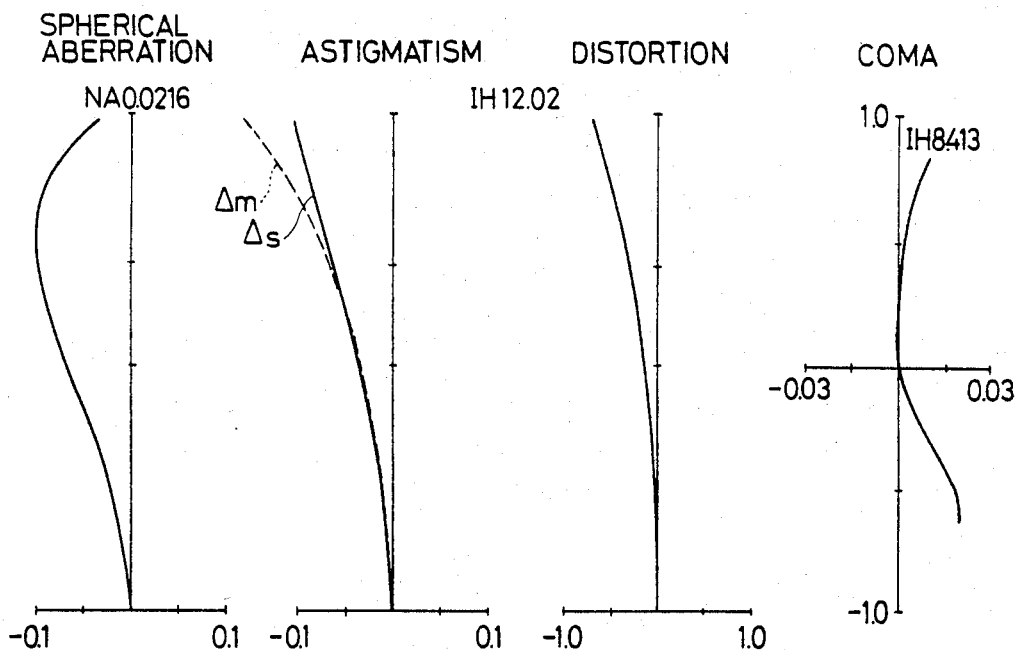
Figure 6:
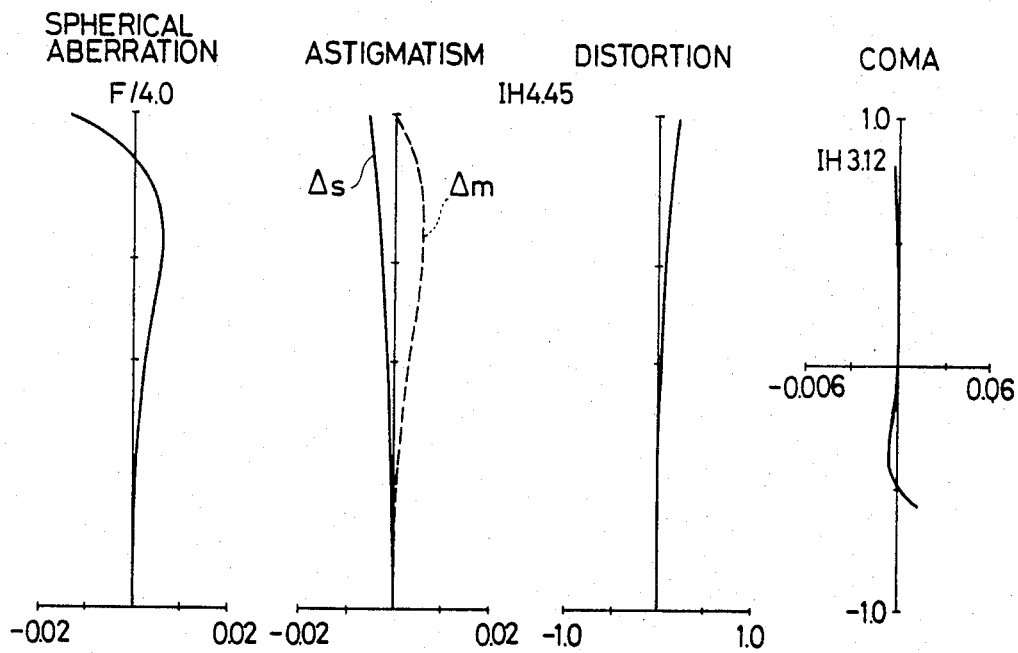
FIGS. 6 through 8 respectively show graphs illustrating aberration curves of Embodiment 2.
Figure 7:
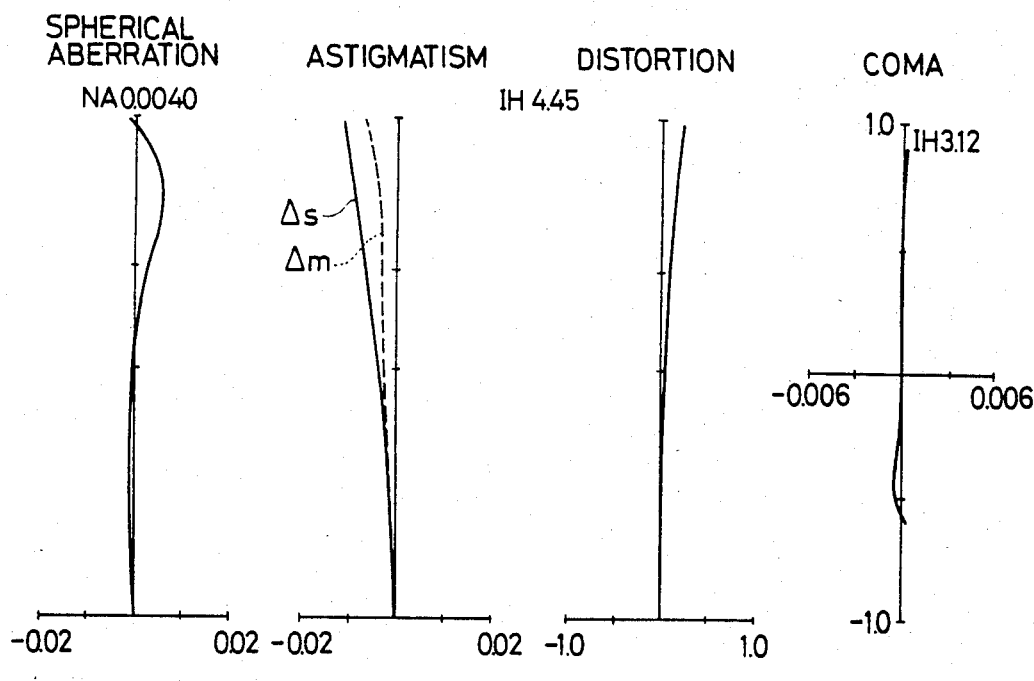
Figure 8:
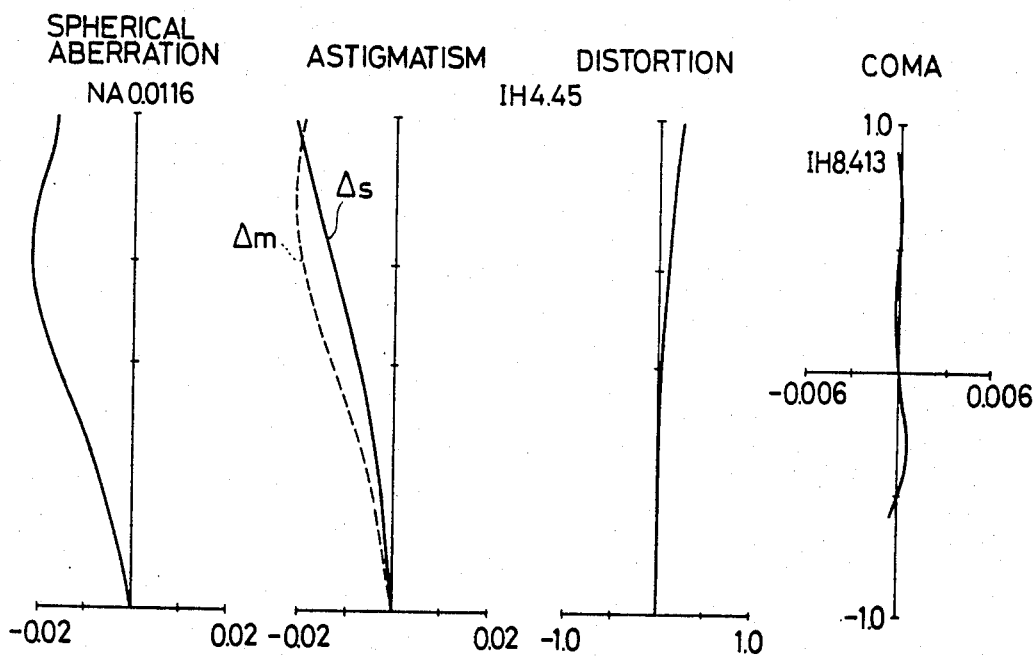

Aberration curves of Embodiment 1 are shown in FIGS. 3 through 5. Out of them, FIG. 3 shows the aberration curves when the lens system is focused on the object point at the infinite distance, and FIGS. 4 and 5 respectively show the aberration curves when the lens system is focused on the object points at 3.06 m and 1.06 m respectively.

Figure 2:
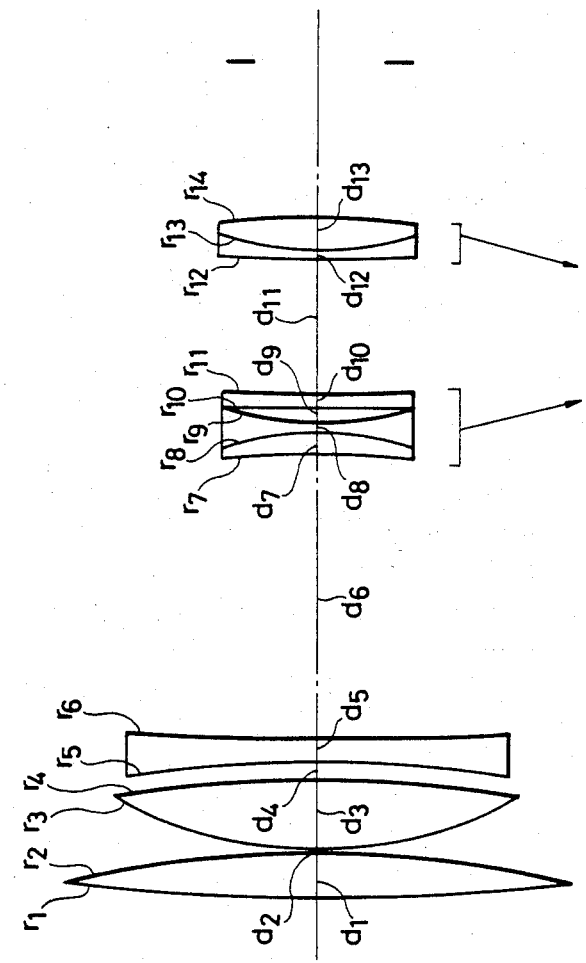
FIG. 2 shows a sectional view of Embodiment 2 of the present invention.

The lens system according to Embodiment 2 has the lens configuration shown in FIG. 2, and the stop is fixed at the position of 1.07 from and in rear of the position where the surface $r_{14}$ comes when the lens system is focused on the object point at the infinite distance.

As it is evident from respective embodiments, aberrations of the lens systems are corrected satisfactorily favourably even when they are focused on objects at short distances. Besides, compared with the cases that the lens systems are focused by moving the intermediate lens group only, the amounts of movements of respective lens groups become about ½ when the focusing method according to the present invention is adopted.

I claim:

1. A telephoto lens system comprising a front lens group having positive refractive power, an intermediate lens group comprising a negative cemented doublet and a negative lens component, and a rear lens group having positive refractive power, said telephoto lens system being arranged to be focused on an object at a short distance from the state focused on an object at the infinite distance by integrally moving said intermediate lens group toward the image side along the optical axis without varying the airspace between said negative cemented doublet and said negative lens component and, at the same time, moving said rear lens group toward the object side, and wherein said front lens group comprises a positive lens component, a positive lens component, and a negative lens component, and said rear lens group comprises a positive cemented doublet, said telephoto lens system arranged to fulfill the condition (1) and (2) shown below:

$$0 < \frac{\phi_s}{\phi} < 4 \left\{ \phi_s = \Sigma \left( \frac{N' - N}{R} \right) \right\} \quad (1)$$

$$0.5 < \frac{|\phi_2|}{\phi_3} < 2.0 \quad (2)$$

where, reference symbol $\phi$ represents the power of the lens system as a whole, reference symbols $\phi_2$ and $\phi_3$ respectively represent the power of the intermediate lens group and rear lens group, reference symbol $\phi_s$ represents the sum of powers of cemented surfaces in the intermediate lens group, reference symbol R represents the radii of curvature of cemented surfaces, and reference symbols N and N' respectively represent refractive indices of lens elements in front and rear of cemented surfaces.

2. A telephoto lens system according to claim 1 further comprising a stop located in rear of said rear lens group, said telephoto lens system being further arranged to vary the diameter of said stop, at the time of focusing, so that the value of NA' on the exit side becomes a value expressed by the following formula:

$$NA' = NA/(1+\beta)$$

where, reference symbol NA represents the numerical aperture on the exit side when the lens system is focused on an object at the infinite distance, and reference symbol $\beta$ represents the lateral magnification when the lens system is focused on an object at a finite distance.

3. A telephoto lens system according to claim 2 which has the following numerical data:

| $f = 100.0$ | $F/4.0$ | $2\omega = 8.9°$ | | |
|---|---|---|---|---|
| $r_1 = 140.584$ | | | | |
| | $d_1 = 2.91$ | $n_1 = 1.497$ | $\nu_1 = 81.61$ | |
| $r_2 = -84.975$ | | | | |
| | $d_2 = 0.31$ | | | |
| $r_3 = 28.095$ | | | | |
| | $d_3 = 4.74$ | $n_2 = 1.43389$ | $\nu_2 = 95.15$ | |
| $r_4 = -93.665$ | | | | |
| | $d_4 = 1.16$ | | | |
| $r_5 = -88.920$ | | | | |
| | $d_5 = 1.69$ | $n_3 = 1.8044$ | $\nu_3 = 39.58$ | |
| $r_6 = 207.795$ | | | | |
| | $d_6 = $ variable | | | |
| $r_7 = -60.896$ | | | | |
| | $d_7 = 1.47$ | $n_4 = 1.80518$ | $\nu_4 = 25.43$ | |
| $r_8 = -21.781$ | | | | |
| | $d_8 = 0.83$ | $n_5 = 1.6134$ | $\nu_5 = 43.84$ | |
| $r_9 = 22.737$ | | | | |
| | $d_9 = 1.09$ | | | |
| $r_{10} = -230.220$ | | | | |
| | $d_{10} = 0.83$ | $n_6 = 1.57309$ | $\nu_6 = 42.57$ | |
| $r_{11} = 224.136$ | | | | |
| | $d_{11} = $ variable | | | |
| $r_{12} = 93.303$ | | | | |
| | $d_{12} = 0.81$ | $n_7 = 1.68893$ | $\nu_7 = 31.08$ | |
| $r_{13} = 27.870$ | | | | |
| | $d_{13} = 2.16$ | $n_8 = 1.697$ | $\nu_8 = 48.51$ | |
| $r_{14} = -51.187$ | | | | |
| $\phi_2 = -3.676,$ $\phi_s = 0.880$ | | $\phi_3 = 2.110,$ | $\frac{|\phi_2|}{\phi_3} = 1.74$ | |

| object point | $d_6$ | $d_{11}$ | $x_i$ | $x_r$ |
|---|---|---|---|---|
| ∞ | 19.21 | 8.94 | 0 | 0 |
| −14.70 m | 20.01 | 7.24 | +0.8 | −0.9 |
| −1.03 m | 21.78 | 3.99 | +2.57 | −2.38 | where, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbols $x_i$ and $x_r$ respectively represent the amount of movements of the intermediate lens group and rear lens group, and reference symbol f represents the focal length of the lens system as a whole.

4. A telephoto lens system comprising a front lens group having positive refractive power, an intermediate lens group comprising a negative cemented doublet, and a rear lens group having positive refractive power, said telephoto lens system being arranged to be focused on an object at a short distance from the state focused on an object at the infinite distance by moving said intermediate lens group toward the image side along the optical axis and, at the same time, moving said rear lens group toward the object side along the optical axis, and wherein said front lens group comprises a positive lens component, and a positive lens component, and said rear lens group comprises a positive lens component, and a negative cemented doublet, said telephoto lens system arranged to fulfill the conditions (1) and (2) shown below:

$$0 < \frac{\phi_s}{\phi} < 4 \left( \phi_s = \Sigma \left( \frac{N' - N}{R} \right) \right) \quad (1)$$

$$0.5 < \frac{|\phi_2|}{\phi_3} < 2.0 \quad (2)$$

where, reference symbol $\phi$ represents the power of the lens system as a whole, reference symbols $\phi_2$ and $\phi_3$ respectively represent the power of the intermediate lens group and rear lens group, reference symbol $\phi_s$ represents the sum of powers of cemented surfaces in the intermediate lens group, reference symbol R represents the radii of curvature of cemented surfaces, and reference symbols N and N' respectively represent refractive indices of lens elements in front and rear of cemented surfaces, said telephoto lens system further comprising a stop located in rear of said intermediate lens group, said telephoto lens system being further arranged to vary the diameter of said stop, at the time of focusing, so that the value of NA' on the exit side becomes a value expressed by the following formula:

NA' = NA/(1+β)

where, reference symbol NA represents the numerical aperture on the exit side when the lens system is focused on an object at the infinite distance, and reference symbol β represents the lateral magnification when the lens system is focused on an object at a finite distance.

5. A telephoto lens system according to claim 4 which has the following numerical data:

| f = 100.0 | F/2.0 | 2ω = 13.7° | |
|---|---|---|---|
| $r_1 = 55.137$ | | | |
| | $d_1 = 10.00$ | $n_1 = 1.49700$ | $\nu_1 = 81.61$ |
| $r_2 = -349.044$ | | | |
| | $d_2 = 0.094$ | | |
| $r_3 = 46.911$ | | | |
| | $d_3 = 6.54$ | $n_2 = 1.61700$ | $\nu_2 = 62.79$ |
| $r_4 = 157.291$ | | | |
| | $d_4 = 2.9$ | | |
| $r_5 = -1163.011$ | | | |
| | $d_5 = 2.86$ | $n_3 = 1.65412$ | $\nu_3 = 39.70$ |
| $r_6 = 32.019$ | | | |
| | $d_6 = 2.83$ | | |
| $r_7 = 38.354$ | | | |
| | $d_7 = 5.56$ | $n_4 = 1.49700$ | $\nu_4 = 81.61$ |
| $r_8 = 100.488$ | | | |
| | $d_8$ = variable | | |
| $r_9 = 468.523$ | | | |
| | $d_9 = 4.33$ | $n_5 = 1.72151$ | $\nu_5 = 29.24$ |
| $r_{10} = -51.635$ | | | |
| | $d_{10} = 1.67$ | $n_6 = 1.52682$ | $\nu_6 = 51.12$ |
| $r_{11} = 27.530$ | | | |
| | $d_{11}$ = variable | | |
| $r_{12} = 52.521$ | | | |
| | $d_{12} = 4.06$ | $n_7 = 1.78800$ | $\nu_7 = 47.43$ |
| $r_{13} = -44.409$ | | | |
| $r_{14} = -39.585$ | | | |
| | $d_{13} = 1.58$ | | |
| | $d_{14} = 1.39$ | $n_8 = 1.60342$ | $\nu_8 = 38.01$ |
| $r_{15} = 19.976$ | | | |
| | $d_{15} = 3.89$ | $n_9 = 1.67790$ | $\nu_9 = 55.33$ |
| $r_{16} = 128.936$ | | | |
| $\phi_2 = -1.366$, | $\phi_3 = 1.706$, | $\frac{|\phi_2|}{\phi_3} = 0.80$ | |
| $\phi_s = 0.377$ | | | |

| object point | $d_8$ | $d_{11}$ | $x_i$ | $x_r$ |
|---|---|---|---|---|
| ∞ | 18.10 | 28.04 | 0 | 0 |
| −3.06 m | 20.07 | 24.24 | +1.97 | −1.83 |
| −1.06 m | 23.83 | 16.61 | +5.73 | −5.70 | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, reference symbols $\nu_1$ through $\nu_2$ respectively represent Abbe's numbers of respective lenses, reference symbols $x_i$ and $x_r$ respectively represent the amounts of movements of the intermediate lens group and rear lens group, and reference symbol f represents the focal length of the lens system as a whole.

6. A telephoto lens system comprising a front lens group having positive refractive power, an intermediate lens group consisting of a negative cemented doublet, and a rear lens group having positive refractive power, said telephoto lens system being arranged to be focused on an object at a short distance from the state focused on an object at the infinite distance by moving said intermediate lens group toward the image side along the optical axis and, at the same time, moving said rear lens group toward the object side along the optical axis, and wherein said front lens group comprises a positive lens component, and a positive lens component, and said rear lens group comprises a positive lens component, and a negative cemented doublet, said telephoto lens system arranged to fulfill the conditions (1) and (2) shown below:

$$0 < \frac{\phi_s}{\phi} < 4 \left( \phi_s = \Sigma \left( \frac{N' - N}{R} \right) \right) \quad (1)$$

$$0.5 < \frac{|\phi_2|}{\phi_3} < 2.0 \quad (2)$$

where, reference symbol $\phi$ represents the power of the lens system as a whole, reference symbols $\phi_2$ and $\phi_3$ respectively represent the power of the intermediate lens group and rear lens group, reference symbol $\phi_s$ represents the sum of powers of cemented surfaces in the intermediate lens group, reference symbol R represent the radii of curvature of cemented surfaces, and reference symbols N and N' respectively represent refractive indices of lens elements in front and rear of cemented surfaces.

* * * * *